(12) United States Patent
Wormsbaecher

(10) Patent No.: US 7,377,854 B2
(45) Date of Patent: May 27, 2008

(54) CONSTANT VELOCITY JOINT WITH ROLLING RADIAL BOOT

(75) Inventor: Hans Wormsbaecher, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 184 days.

(21) Appl. No.: 11/288,467

(22) Filed: Nov. 29, 2005

(65) Prior Publication Data

US 2007/0123358 A1    May 31, 2007

(51) Int. Cl.
*F16D 3/84* (2006.01)
(52) U.S. Cl. .................... 464/171; 464/906
(58) Field of Classification Search ........... 464/145, 464/170, 171, 173, 906
See application file for complete search history.

(56) References Cited

U.S. PATENT DOCUMENTS

| | | | | |
|---|---|---|---|---|
| 1,871,883 A | | 8/1932 | Geyer | |
| 2,685,184 A | * | 8/1954 | De Nador et al. | 464/171 |
| 3,842,621 A | * | 10/1974 | Mazziotti | 464/171 |
| 4,196,598 A | * | 4/1980 | Hirai et al. | 464/111 |
| 4,516,959 A | | 5/1985 | Krude | |
| 4,597,745 A | | 7/1986 | Orian | |
| 4,784,441 A | * | 11/1988 | Welschof et al. | 464/906 |
| 5,346,431 A | * | 9/1994 | Okuyama et al. | 464/171 |
| 6,406,375 B1 | | 6/2002 | Herchenbach et al. | |

FOREIGN PATENT DOCUMENTS

CH            333637 A      10/1958

\* cited by examiner

*Primary Examiner*—Greg Binda
(74) *Attorney, Agent, or Firm*—Jennifer M. Brumbaugh; Mick A. Nylander

(57) ABSTRACT

A direct torque flow constant velocity joint having a rolling radial boot is provided and includes a DTF CVJ connector, a shroud assembly and a rolling radial boot. The DTF CVJ connector includes an outer joint part and an inner joint part, such that the shroud assembly is connected to the inner joint part and substantially surrounds the outer joint part of the DTF CVJ. The shroud assembly includes a circumferential clamp portion so that a rolling radial boot is connected between it and the outer joint part of the DTF CVJ. The rolling radial boot is covered by the shroud assembly and seals the DTF CVJ. The shroud assembly also protects the boot from external debris.

14 Claims, 2 Drawing Sheets

CONSTANT VELOCITY JOINT WITH ROLLING RADIAL BOOT

TECHNICAL FIELD

The present invention relates generally to motor vehicle shaft joints, and more particularly concerns a rolling radial boot for a direct torque flow constant velocity joint.

BACKGROUND

Constant velocity joints connecting shafts to drive units are common components in automotive vehicles. The drive unit typically has an output shaft or an input shaft for receiving the joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly which is connected, for instance, at one end to the output shaft of a transmission and, at the other end, to the input shaft of a differential. The shaft is solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Optionally, the joint may be coupled to a shaft for torque transfer utilizing a direct torque flow connection. Regardless of the connection type, constant velocity joints require, for improved joint life, a sealed environment.

Elastomer boots of the flexible or soft type improve the life of a constant velocity joint by sealing out contaminates and retaining joint lubrication. Elastomer boots are primarily used for sealing two parts that can be articulated relative to one another and which, more particularly, rotate at the same time. These parts constitute a joint. A typical application refers to sealing joints of the constant velocity and universal types. For this purpose, a boot with a cylindrical portion, typically having a smaller diameter is slipped on to a shaft connected to a first joint component, and an annular portion with a greater diameter is connected either directly or via an intermediate element to a second joint component. Between the cylindrical portion and the annular portion with the greater diameter, there extends a wall. The wall has the shape of half a torus for a roll boot, and has a bellows shape for a convoluted boot. When the two joint components articulate relative to one another, the radius of curvature of the wall decreases on the inside of the angle and increases on the outside of the angle. When the joint rotates in the articulated condition, the change in curvature in the roll boot wall moves across the circumference, so that during a complete 360 degree rotation, each point of the boot wall passes through a curvature maximum and a curvature minimum causing flexing of the boot wall. Flexing also occurs for each rotation of the roll boot due to gravitational and centripetal forces. The flexing action may increase material decay caused by mechanical, chemical and thermal attack related to the environment in which the boot is used.

Moreover, a roll boot may be prone to puncture or tearing due to external debris. Additionally, the roll boot may blow out or rupture when subjected to increased lubrication pressure when used in high-speed or high angle joint seal applications.

It would be advantageous to have a boot and sealing system that provides robust performance in most operating conditions indicated above.

SUMMARY OF THE INVENTION

Accordingly, the present invention provides a rolling radial boot for a direct torque flow constant velocity joint. The rolling radial boot includes a rigid shroud that covers the rolling radial boot. The rigid shroud provides the benefit of supporting the rolling radial boot while sealing a constant velocity joint (CVJ) thereby making the rolling radial boot less prone to puncture or tearing. The inventive rolling radial boot with the rigid shroud may be used with CVJ assemblies having shaft to drive torque transfer utilizing direct torque flow connectors. Additionally, the rolling radial boot may include improved boot blow out or rupture protection when subjected to increased internal joint pressure. Also, the rolling radial boot being supported by the rigid shroud may overcomes flexing caused by gravitational or centripetal forces thereby extending the life of the boot.

In an embodiment, a direct torque flow constant velocity joint having a rolling radial boot is provided and includes a DTF CVJ connector, a shroud assembly and a rolling radial boot. The DTF CVJ connector includes an outer joint part and an inner joint part, such that the shroud assembly is connected to the inner joint part and substantially surrounds the outer joint part of the DTF CVJ connector. The shroud assembly includes a circumferential clamp portion so that a rolling radial boot is connected between it and the outer joint part of the DTF CVJ connector. The rolling radial boot is covered by the shroud assembly and seals the DTF CVJ connector. The shroud assembly also protects the boot from external debris. The shroud assembly of this embodiment includes a rigid shroud supported by a support member.

An embodiment of the invention is provided wherein the shroud assembly includes a rigid shroud containing a support member.

The present invention provides a direct torque flow CVJ with a rolling radial boot. The present invention itself will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

In the following description, various operating parameters and components are described for one or more constructed embodiments. These specific parameters and components are included as examples and are not meant to be limiting.

While the invention is described with respect to a rigid joint sealing system of a constant velocity universal joint for use in a vehicle, the following apparatus is capable of being adapted for various purposes including automotive vehicles drive axles, motor systems that use a propeller shaft, or other vehicles and non-vehicle applications which require shaft assemblies for torque transmission.

Figure 1:
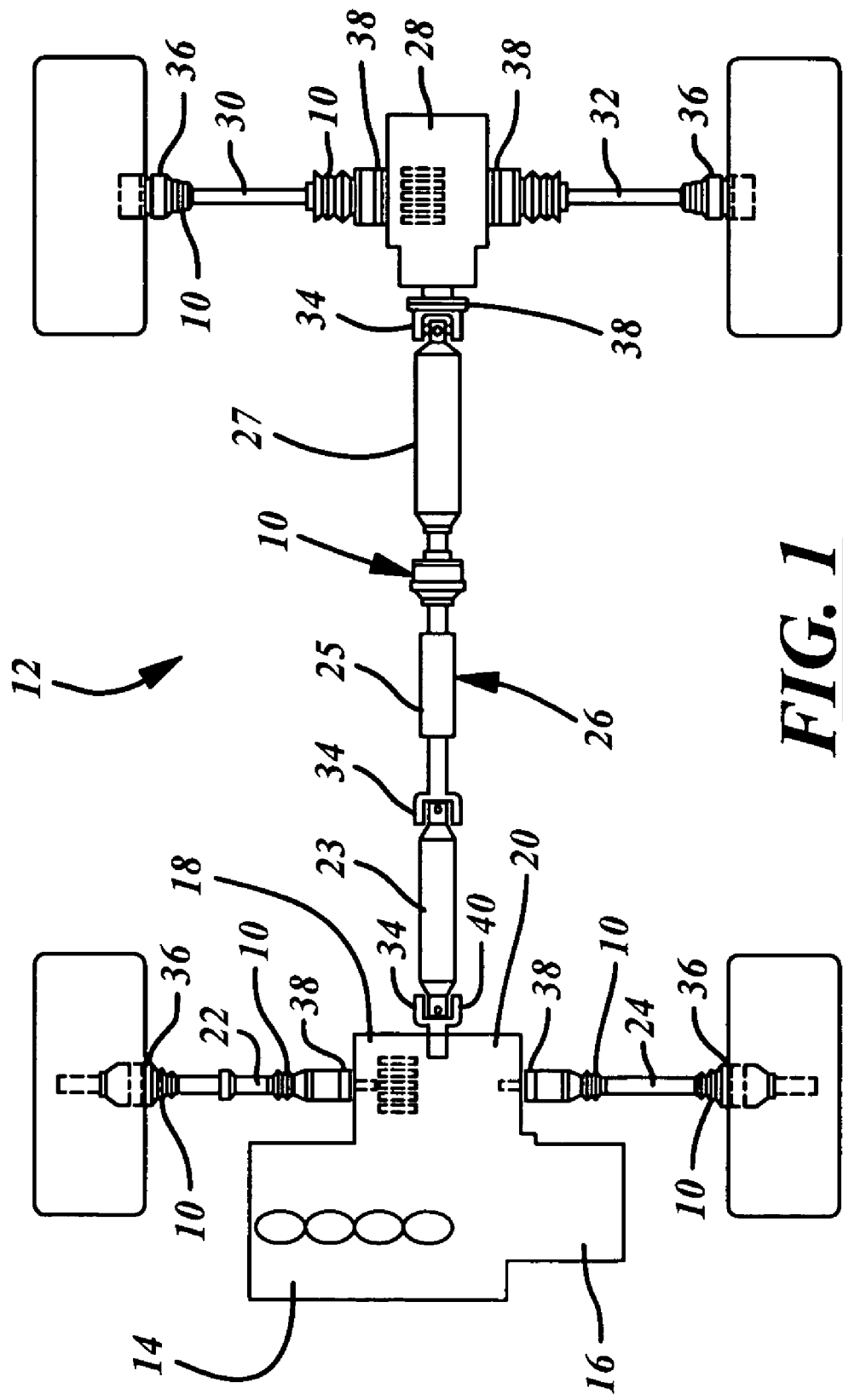
FIG. 1 shows a plan view of an exemplary drive system for a typical 4-wheel drive automobile wherein the present invention may be used.

An exemplary drive system 12 for a typical 4-wheel drive automobile is shown in FIG. 1. While a 4-wheel drive system is shown and described, the concepts here presented could apply to a single drive unit system or multiple drive unit system, including rear wheel drive only vehicles, front wheel drive only vehicles, all wheel drive vehicles, and 4-wheel drive vehicles. In this example, the drive system 12 includes an engine 14 that is connected to a transmission 16 and a power take-off unit 18. A front differential 20 has a right hand side half shaft 22 and left hand side half shaft 24 each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which ends with a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in every day driving of automotive vehicles in both the half shafts, interconnecting shafts and propeller shafts of these vehicles. Optionally, each cardan joint 34 may be replaced with any other suitable type of joint, including constant velocity joint types. The direct torque flow constant velocity joint with a rolling radial boot of the present invention may be utilized to advantage for any of the above mentioned joint locations.

The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application. Thus, any of the traditional connections identified in FIG. 1 at 10 or 34 may be direct torque flow connections in accordance with a first embodiment (FIG. 2) or a second embodiment (FIG. 3) of the present invention.

Figure 2:
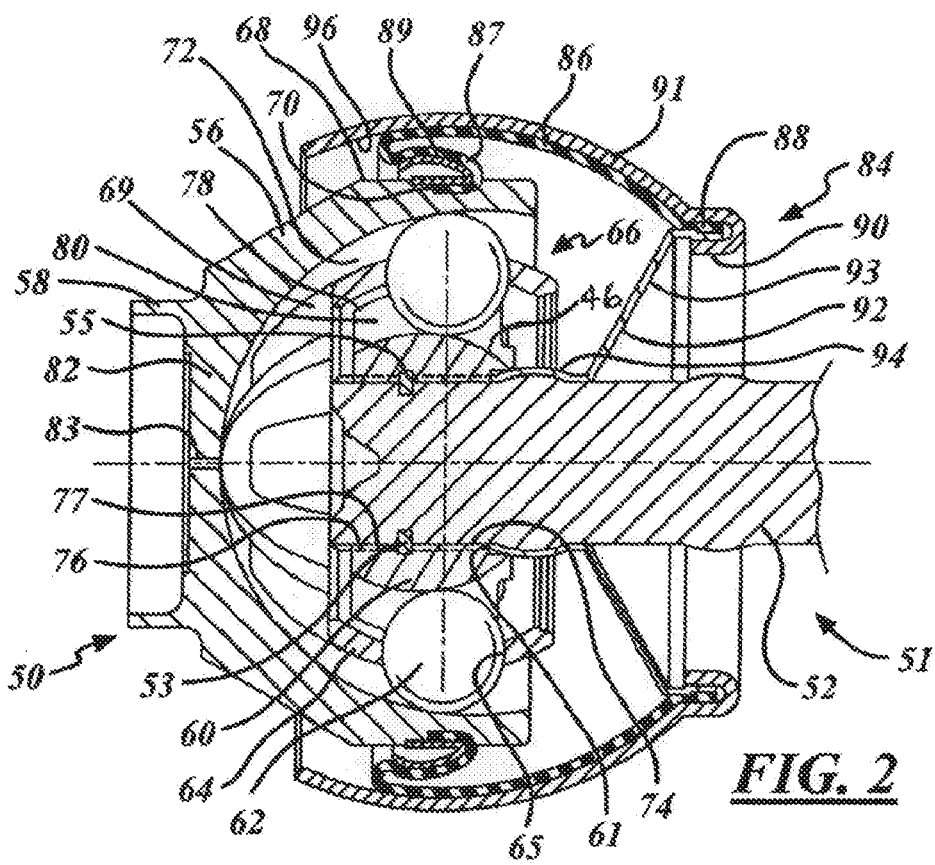
FIG. 2 shows a direct torque flow constant velocity joint having a rolling radial boot.
Figure 3:
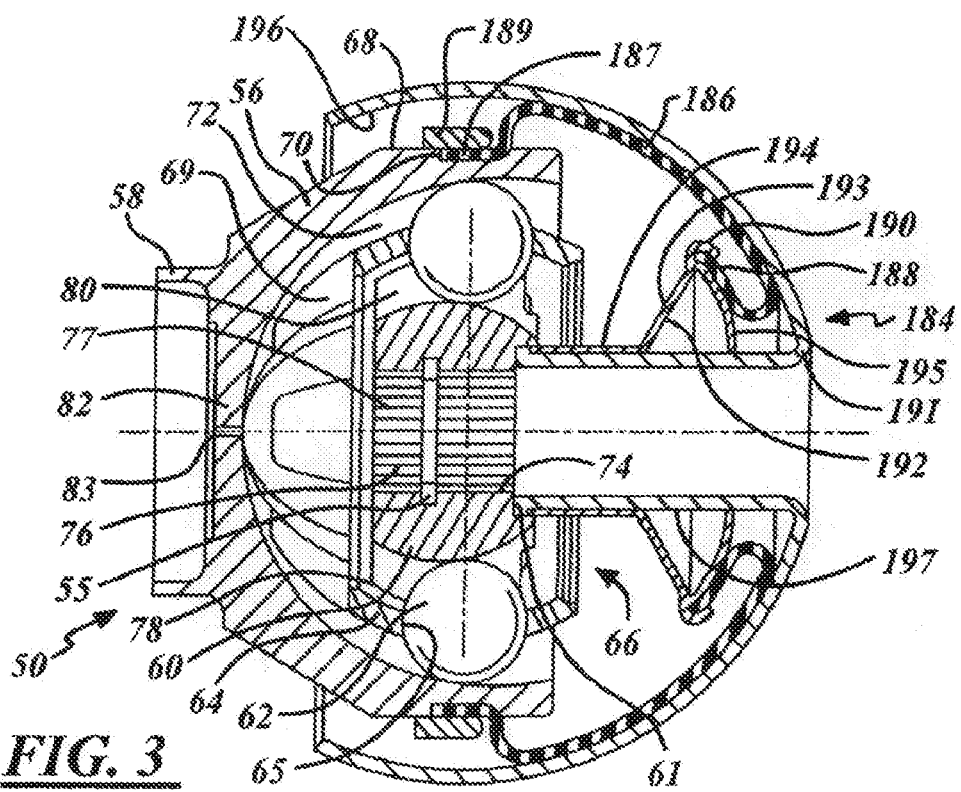
FIG. 3 shows another embodiment of a direct torque flow constant velocity joint having a rolling radial boot.

For completeness of the description of the first and second embodiments of the present invention as given in FIGS. 2 and 3, the term direct torque flow (DTF) connection refers to a connection from the inner race of a constant velocity joint (CVJ) to the shaft of a differential, transmission or transfer case, generally supplied by the customer. The connection typically is in the form of a spline because of its robust design features as understood by one skilled in the art. However, it is anticipated that other forms of connection are appropriate including fixed and releasable connections between the inner race and shaft. A mating key connection is just one example, without limitation, of a releasable connector between the inner race and the shaft. A welded connection would be a fixed connection example. Thus, a DTF connection refers to the inner race coupling to the shaft of a drive unit, such as a differential, transmission or transfer case without limitation, as opposed to the traditional connection mentioned above. The connection type may be divided into two styles of DTF connection types, i.e. direct or indirect, as described in United States Patent Application Publication No: 2007/0123357 A1 titled "Direct Torque Flow Constant Velocity Joint with Male Connector" filed on Nov. 29, 2005, and incorporated by reference herein. The DTF direct connection utilizes an extension shaft on the inner joint part to provide a male connection to a drive unit. Whereas, the DTF indirect connection utilizes a female coupling on the inner joint part to provide a female connection to a shaft of a drive unit, such as shown in FIG. 2.

Also, as used herein, a DTF connector refers to a joint coupled to a shaft which forms a DTF propshaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

Although the present invention as described in the first and second embodiments illustrated in FIGS. 2 and 3 utilizes a DTF circlip CVJ connector type, it is intended that the inventive rigid joint sealing system may be applied equally to constant velocity joints having other connector types, for example, without limitation, DTF clip CVJ connector, DTF collet CVJ connector or DTF threaded fastener CVJ connector as described in PCT Patent Application No. PCT/US2005/036299, filed on Oct. 11, 2005, and incorporated by reference herein. Moreover, the connection may be direct or indirect thereby providing various combinations of connector types for various DTF CVJ applications utilizing the present invention.

FIGS. 2 and 3 will initially be described jointly below to the extent that their details correspond to one another. FIGS. 2 and 3 each show a DTF circlip CVJ connector 50 type for connection, but only FIG. 2 includes a journal shaft 52 of a drive unit (not shown) coupled to the CVJ connector 50 and axially held by a circlip 53 forming a DTF CVJ indirect connection 51. Generally, the DTF circlip CVJ connector 50 comprises an outer joint part 56 welded to the propeller shaft (not shown) by a collar 58 of the outer joint part 56, an inner joint part 60, torque transmitting balls 62 and a ball cage 64.

The outer joint part 56 generally has a circumferential shaped or semi-spherical bore 66 therethrough. On an outer surface 68 of the outer joint part 56 is located at least one circumferential channel 70 around the entire outer periphery of the outer joint part 56. The outer joint part 56 is generally made of a steel material, however it should be noted that any other type of metal material, hard ceramic, plastic, or composite material, etc. may also be used for the outer joint part 56. The material is required to be able to withstand the high speeds, temperatures and contact pressures of the DTF circlip CVJ connector 50. The outer joint part 56 also includes a plurality of axially opposed ball tracks 72 located on an inner surface 69 thereof. The tracks 72 generally form a spherical shaped path within the inner surface 69 of the outer joint part 56. The tracks 72 are axially opposed such that one half of the ball tracks 72 open to a side of the outer joint part 56 opposite to that of the other half of the ball tracks 72 in any number of patterns. Optionally, for different types of CVJ's, the ball tracks all may open or axially align on the same side of the outer race. Also, the ball tracks 72 may also be of a gothic or elliptical shape provided the pressure angle and conformity are maintained or may be other shapes as is understood by a person having skill in the art. Moreover, the ball tracks 72 on the inner surface 69 of the outer joint part 56 may also be double offset tracks. It should be noted that in the embodiments shown in the drawings are a four plus four constant velocity joint, which has a total of eight balls in the DTF circlip CVJ connector 50. Further, it is recognized the DTF circlip CVJ connector may be a fixed CVJ, including without limitation a Verschiebegelnk Loebro (VL) joint, Rzeppa joint (RF), Angular Contact (AC) joint, Double Offsett (DO) joint, or tripod joints including other fixed CVJ's. However, it should be noted that it is contemplated to make a joint having any number of balls incorporating all of the features of the DTF circlip CVJ connector 50 according to the present invention.

The inner joint part 60 generally has a circumferential shape. The inner joint part 60 is arranged within the bore 66 of the outer joint part 56. The inner joint part 60 includes a drive unit side 61, an inner bore 74 that has a plurality of splines 76 and a circlip groove 55 on the inner surface 77 thereof, for axially retaining the CVJ in a rotationally fast way to a shaft 52. However, it is recognized that for the direct type of DTF CVJ connector the inner joint part 60 would include a male extension optionally having splines on the outer surface thereof instead of the female connection type of the present embodiment of the indirect type. Also, axial retention of the inner joint part 60 with a shaft 52 may be accomplished in other ways as would be recognized by a person of skill in the art. The outer surface 78 of the inner joint part 60 includes a plurality of ball tracks 80 that are axially opposed. The ball tracks 80 generally have a spherical shape and are aligned with the ball tracks 72 on the outer joint part 56 such that the axial angle will open in a similar or the same direction as the ball track 72 directly aligned above it on the outer joint part 56. The ball tracks 80 on the outer spherical surface of the inner joint part 60 have one half of the ball tracks 80 axially oriented in one way while the other half of the ball tracks 80 are axially oriented in the opposite direction. The ball tracks 80 will open in an alternating pattern around the outer circumference of the inner race 46 in a matching relationship to that of the ball tracks 72 of the outer joint part 56. It should be noted that in one embodiment the inner joint part 60 is made of steel, however any other, metal composite, hard plastic, ceramic, etc. may also be used.

The ball cage 64 generally has a ring like appearance. The ball cage 64 is arranged within the bore 66 of the outer joint part 56 such that it is not in contact with the inner surface of the outer joint part 56. The cage 64 has a plurality of orifices or windows 65 through a surface thereof. The number of windows 65 may match the number of ball tracks 72, 80 on the outer joint part 56 and inner joint part 60 of the constant velocity joint 10, which is eight windows 65 therethrough in the present embodiment of the invention. The number of balls and windows may, however, differ. The cage 64 along with the inner joint part 60 are preferably made of a steel material but any other hard metal material, plastic, composite or ceramic, etc. may also be used.

The constant velocity joint 30 includes a plurality of balls 62. The balls 62 are each arranged within one each of the orifices 65 of the cage 64 and within a ball track 72, 80 of the outer joint part 56 and of the inner joint part 60. Therefore, the balls 62 will be capable of rolling in the axially opposed tracks 72, 80 aligned in the same direction.

The DTF circlip CVJ connector 50 may include a grease cap or barrier 82 on one end. The barrier 82 is generally made of a metal material, however any plastic, rubber, ceramic or composite material may also be used. The barrier 82 is press fit or integrally constructed between the outer joint part 56 and the propeller shaft (not shown). However, any other securing method known may also be used such as fasteners, bonding, etc. The barrier 82 will insure the grease, which is used as a lubricant, will remain within the DTF circlip CVJ connector 50. Optionally, a vent port 83 may be placed through the barrier 82 to relieve any internal pressure. However, the optional vent port 83 is not necessary in order to vent the internal pressure, because the DTF circlip CVJ connector 50 includes a rolling radial boot and a shroud assembly to complete the CVJ seal between an inner joint part 60 and an outer joint part 56. The rolling radial boot and the shroud assembly contain internal pressure changes, which will now be described for the first (FIG. 2) and the second (FIG. 3) embodiments of the invention.

FIG. 2 shows a first embodiment of an inventive direct torque flow constant velocity joint 10 having a rolling radial boot 86. A first end 87 of the rolling radial boot 86 is connected to an outer joint part 56 via circumferential channel 70 on the outer surface 68 thereof. Any known securing method can be used to hold the boot 86 around the outer joint part 56 such as a boot clamp, fastener, etc. However, in this embodiment the first end 87 of the boot 86 is secured with a guide clamp member 89 to the outer joint part 56. The rolling radial boot 86 is partially semi-spherical extending between the first end 87 and a second end 88, such that the first end 87 may roll over the clamp member 89. The rolling radial boot 86 is generally made of a urethane material but any other pliable material such as fabric, plastic, TPE or rubber may also be used for the boot 86. The second end 88 of the boot 86 is connected to a shroud assembly 84 either via a circumferential channel or clamping portion 90 thereof.

The shroud assembly 84 includes a rigid shroud 91 and a support member 92, wherein the boot 86 is substantially retained within the inside surface 96 of the substantially torus shaped shroud 91 such that the boot 86 may roll on and off the shroud 91 while the CVJ articulately rotates through each cycle. The shroud 91 supports the boot 86 with interfacing contact area between the torus portion of the shroud 91 with the semi-spherical portion of the boot 86. Moreover, the shroud 91 protects the boot by providing the external rigid cover over the boot 86 while structurally supporting the boot 86 during internal pressure changes. The support member 92 supports the shroud 91 and seals the second end 88 of the boot 86 with the clamping portion 90 of the shroud 91. The shroud 91 may be made from plastic, metal or any other material having a rigid attribute required for supporting and protecting the boot 86 as would be recognized by a person of skill in the art.

The support member 92 completes the seal between the inner joint part 60 and the boot 86. The support member 92 includes a conical section 93 and a shaft section 94. The conical section 93 supports the cantilevered rigid shroud 91 while providing the required clearance for articulation of the joint parts. The conical section 93 need not have a conical shape, but may be any other shape. The shaft section 94 may seal against the shaft 52 and is compressively attached to the drive unit side 61 of the inner joint part 60. The support member 92 may be attached to the inner joint part 60 using other known attachment methods. The support member 92 may be made from plastic, metal or any other material having a rigid attribute required for supporting the shroud 91 and connecting to the inner joint part and shaft. Optionally, the support member 92 may include a seal (not shown) on the shaft section 94 for providing an additional seal between the journal shaft 52 and the DTF circlip CVJ connector 50.

Generally, in the first embodiment, the boot 86 rolls over the outer joint part 56 during cyclic articulations.

FIG. 3 shows a second embodiment of an inventive direct torque flow constant velocity joint 50 having a rolling radial boot 186. A first end 187 of the rolling radial boot 186 is connected to an outer joint part 56 via a circumferential channel 70 on the outer surface 68 thereof. Any known securing method can be used to hold the boot 86 around the outer joint part 56 such as a boot clamp, fastener, etc. However, in this embodiment the first end 187 of the boot 186 is secured with a clamp member 189 to the outer joint part 56. The rolling radial boot 186 is substantially torical extending between the first end 187 and a second end 188. The rolling radial boot 186 is generally made of a urethane material but any other pliable material such as fabric, plastic, TPE or rubber may also be used for the boot 186. The second end 188 of the boot 186 is connected to a shroud assembly 184 either via a circumferential channel or clamping portion 190 thereof.

The shroud assembly 184 includes a rigid shroud 191 and a support member 192, wherein the boot 186 is retained within the inside surface 196 of the substantially torus shaped shroud 191 such that the boot 186 may roll on and off the support member 192 while the CVJ articulately rotates through each cycle of the joint. The shroud 191 supports the boot 186 in contact over the area between the torus portion of the shroud 191 and the torical portion of the boot 186. Moreover, the shroud 191 protects the boot by providing external rigid covering over the boot 186 while structurally supporting the boot 186 during internal pressure changes. The support member 192 rest within the shroud 191 and seals the inwardly turned second end 188 of the boot 186 with the clamping portion 190 of the support member 192. The shroud 191 may be made from plastic, metal or any other material having a rigid attribute required for supporting and protecting the boot 186 as would be recognized by a person of skill in the art.

The support member 192 completes the seal between the inner joint part 160 and the boot 186. The support member 192 includes a conical section 193, a shaft section 194 and a guide section 195. The guide section 195 of the support member 192 takes up the boot 186 roll while the CVJ articulately rotates through each cycle of the joint. The conical section 193 supports the guide section 195 while providing the required clearance for articulation of the joint parts. The conical section 193 need not have a conical shape, but may be of any other shape. The shaft section 194 is sealingly attached to the drive unit side 61 of the inner joint part 60 upon an inner portion 197 of the rigid shroud 191. Optionally, the rigid shroud 191 is sealingly attached to the drive unit side 61 of the inner joint part 60 having the support member 192 sealingly attached thereto. The support member 192 may be made from plastic, metal or any other material having a attribute required for supporting the boot 186 while connecting to the inner joint part 60 or shroud 191. Optionally, the support member 192 or shroud 191 may include a seal (not shown) thereby providing an additional seal between it and the journal shaft 52.

Generally, in the second embodiment, different from the first embodiment, the boot's 186 motion occurs in front of the outer joint part 56 during cyclic articulations.

The shroud assemblies 84, 184 are substantially retained with respect to the same reference frame as an inner joint part 60 or the combination of an inner joint part 60 with a journal shaft 52 such that a rolling radial boots 86, 186 functionally seals as an outer joint part 56 when rotationally articulated with respect to the inner joint part 60. It is recognized that the rigid shroud 91 of the first embodiment requires a support member 92 in order to be substantially retained with respect to the same reference frame just mentioned, whereas the rigid shroud 191 of the second embodiment does not because it is connected to an inner joint part 60.

While the material, coupling and treatment of the various other DTF parts have not been discussed; appropriate selection would be well understood by a person of skill in the art.

The invention presented in the above embodiments utilizes direct torque flow constant velocity joints, but the invention is equally suitable for applications involving traditional constant velocity joints.

From the foregoing, it can be seen that there has been brought to the art a new and improved direct torque flow constant velocity joint having a rolling radial boot. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A direct torque flow constant velocity joint with a rolling radial boot comprising:
   a DTF connector comprising;
   a shaft;
   an outer joint part coupled to said shaft, said outer joint part having a bore, a plurality of ball tracks located in said bore and a circumferential channel;
   a plurality of balls; and
   an inner joint part, said inner joint part having an outer surface, a corresponding plurality of ball tracks located on said outer surface and a drive unit side, wherein said inner joint part is coupled within said bore of said outer joint part by said plurality of balls arranged within said tracks of said outer joint part and said inner joint part is selectively attachable to a supplied drive unit;
   a shroud assembly, said shroud assembly having a clamp portion and said shroud assembly coupled to said drive unit side of said inner joint part of said DTF connector;
   a rolling radial boot coupled between said circumferential channel of said outer joint part of said DTF connector and said clamp portion of said shroud assembly, said rolling radial boot having a first end and a second end, said first end coupled to said circumferential channel of said outer joint part, and said second end clamped to said clamp portion of said shroud assembly; and
   an arched guide member, selectively clamping said first end of said rolling radial boot to said outer joint part, wherein said rolling radial boot is guided over said arched guide member during rotational articulation of said DTF connector.

2. The direct torque flow constant velocity joint with a rolling radial boot according to claim 1 wherein said DTF connector is a DTF circlip CVJ connector.

3. The direct torque flow constant velocity joint with a rolling radial boot according to claim 1 wherein said inner joint part of said DTF connector includes an inner bore and a spline making a DTF indirect connector for selectively attaching to a supplied drive unit.

4. The direct torque flow constant velocity joint with a rolling radial boot according to claim 1 wherein said rolling radial boot is made from a pliable urethane material.

5. The direct torque flow constant velocity joint with a rolling radial boot according to claim 1 wherein said shroud assembly is made from a plastic material.

6. The direct torque flow constant velocity joint with a rolling radial boot according to claim 4 wherein said rolling radial boot is substantially semi-spherical between said first end and said second end.

7. The direct torque flow constant velocity joint with a rolling radial boot according to claim 1 wherein said shroud assembly includes a rigid shroud and a support member, wherein said rigid shroud has an inside surface for substantially supporting said rolling radial boot during rotational articulations of said DTF connector, and said rigid shroud being cantilevered by said support member at said clamp portion.

8. The direct torque flow constant velocity joint with a rolling radial boot according to claim 7 wherein said rigid shroud is substantially toridal and said inside surface conforms along a portion of said rolling radial boot.

9. The direct torque flow constant velocity joint with a rolling radial boot according to claim 1 further including a ball cage having a plurality of windows for receiving said plurality of balls.

10. The direct torque flow constant velocity joint with a rolling radial boot according to claim 1 wherein said outer joint part includes a vent port for relieving pressure when said DTF connector is selectively coupled to a drive unit.

11. A rolling radial boot assembly comprising:
a CVJ, said CVJ having an outer joint part and an inner joint part;
a shroud assembly coupled to said inner joint part and substantially surrounds said outer joint part of said CVJ, said shroud assembly has a circumferential clamp portion; and
a rolling radial boot coupled between said outer joint part of said CVJ and said clamp portion of said shroud assembly, wherein said rolling radial boot is covered by said shroud assembly and protects the boot from external debris and provides support from
wherein said shroud assembly includes a rigid shroud and a support member, wherein said support member is coupled to said inner joint part and extends radially outward from said inner joint part; and
wherein said rigid shroud covers said boot where said rigid shroud is cantilevered by said support member and coupled to said support member at said clamp portion, said rigid shroud having an inside surface for substantially supporting said rolling radial boot during rotational articulations of said connector, and said rigid shroud is substantially torus-shaped and said inside surface conforms along a portion of said rolling radial boot.

12. The rolling radial boot assembly according to claim 11 wherein said CVJ comprises:
a shaft;
a plurality of balls;
a ball cage having a plurality of windows for receiving said plurality of balls; and
wherein said outer joint part is coupled to said shaft, said outer joint part having a bore, a plurality of ball tracks located in said bore and a circumferential channel;
wherein said inner joint part includes an outer surface, a matching plurality of ball tracks located on said outer surface and a drive unit side, wherein said inner joint part is coupled within said bore of said outer joint part by said plurality of balls arranged within said tracks of said outer joint part and said inner joint part is selectively attachable to a supplied drive unit.

13. The rolling radial boot assembly according to claim 11 wherein further including a guide member, selectively clamping a first end of said rolling radial boot to said outer joint part, wherein said rolling radial boot is guided over said guide member during rotational articulation of said CVJ.

14. A direct torque flow constant velocity joint connection having a rolling radial boot comprising:
a direct torque flow constant velocity joint connector, said direct torque flow constant velocity joint connector having an outer joint part and an inner joint part;
a drive unit coupled to said inner joint part of said direct torque flow constant velocity joint connector;
a rigid shroud coupled to said inner joint part and substantially surrounding said outer joint part of said direct torque flow constant velocity joint connector, said rigid shroud including a circumferential clamp portion;
a support member, wherein said support member is coupled to said inner joint part and extends radially outward from said inner joint part; and
a rolling radial boot coupled between said outer joint part of said direct torque flow constant velocity joint connector and said clamp portion of said rigid shroud, wherein said rolling radial boot is covered by said rigid shroud and protects the boot from external debris, said rigid shroud covers said boot where said rigid shroud is cantilevered by said support member and coupled to said support member at said clamp portion.

* * * * *

UNITED STATES PATENT AND TRADEMARK OFFICE
CERTIFICATE OF CORRECTION

PATENT NO. : 7,377,854 B2
APPLICATION NO. : 11/288467
DATED : May 27, 2008
INVENTOR(S) : Hans Wormsbaecher It is certified that error appears in the above-identified patent and that said Letters Patent is hereby corrected as shown below:

In Claim 6, column 9, line 8, change "claim 4" to --claim 1--

In Claim 11, column 9, line 42, insert --internal pressure changes;-- after "from"

Signed and Sealed this

Twenty-sixth Day of August, 2008

JON W. DUDAS
*Director of the United States Patent and Trademark Office*